(12) United States Patent
Pinschmidt, Jr. et al.

(10) Patent No.: US 11,820,072 B2
(45) Date of Patent: Nov. 21, 2023

(54) DUAL CURE RESINS FOR ADDITIVE MANUFACTURING

(71) Applicant: Carbon, Inc., Redwood City, CA (US)

(72) Inventors: Robert K Pinschmidt, Jr., Carrboro, NC (US); Andrew Gordon Wright, Mountain View, CA (US); Jason P. Rolland, San Carlos, CA (US)

(73) Assignee: Carbon, Inc., Redwood City, CA (US)

( * ) Notice: Subject to any disclaimer, the term of this patent is extended or adjusted under 35 U.S.C. 154(b) by 0 days.

(21) Appl. No.: 17/645,540

(22) Filed: Dec. 22, 2021

(65) Prior Publication Data

US 2022/0118690 A1 Apr. 21, 2022

Related U.S. Application Data

(63) Continuation of application No. 17/276,858, filed as application No. PCT/US2019/052553 on Sep. 24, 2019, now Pat. No. 11,241,822.

(60) Provisional application No. 62/858,687, filed on Jun. 7, 2019, provisional application No. 62/735,987, filed on Sep. 25, 2018.

(51) Int. Cl.

| | |
|---|---|
| B29C 35/04 | (2006.01) |
| C08F 2/46 | (2006.01) |
| C08F 2/50 | (2006.01) |
| C08G 61/04 | (2006.01) |
| B29C 64/129 | (2017.01) |
| B33Y 10/00 | (2015.01) |
| B33Y 70/00 | (2020.01) |
| B01J 31/12 | (2006.01) |
| C08F 2/44 | (2006.01) |
| C08F 4/50 | (2006.01) |
| C08G 18/08 | (2006.01) |
| C08G 18/10 | (2006.01) |
| C08G 18/22 | (2006.01) |

(52) U.S. Cl.
CPC ............ B29C 64/129 (2017.08); B01J 31/12 (2013.01); B33Y 10/00 (2014.12); B33Y 70/00 (2014.12); C08F 2/44 (2013.01); C08F 2/50 (2013.01); C08F 4/50 (2013.01); C08G 18/0857 (2013.01); C08G 18/10 (2013.01); C08G 18/222 (2013.01)

(58) Field of Classification Search
CPC ...... B01J 31/12; C08G 18/0857; C08G 18/10; C08G 18/222; C08G 18/678; B29C 64/129; B29C 64/135; C08L 75/16; B33Y 70/00; B33Y 10/00; C08F 4/50; C08F 2/50; C08F 2/44; C08F 290/067; C08F 220/1811
USPC ........ 264/401; 522/6, 1, 71, 189, 184; 520/1
See application file for complete search history.

(56) References Cited

U.S. PATENT DOCUMENTS

| | | |
|---|---|---|
| 3,213,058 A | 10/1965 | Boyle et al. |
| 3,694,389 A | 9/1972 | Levy |
| 5,236,637 A | 8/1993 | Hull |
| 5,391,072 A | 2/1995 | Lawton et al. |
| 5,529,473 A | 6/1996 | Lawton et al. |
| 5,672,731 A | 9/1997 | Chen et al. |
| 5,965,686 A | 10/1999 | Blank et al. |
| 6,433,121 B1 | 8/2002 | Petrovic et al. |
| 6,861,475 B2 | 3/2005 | Ilenda et al. |
| 6,916,867 B2 | 7/2005 | Gugumus |
| 7,157,586 B2 | 1/2007 | Wood et al. |
| 7,438,846 B2 | 10/2008 | John |
| 7,625,977 B2 | 12/2009 | Lutz et al. |
| 7,642,316 B2 | 1/2010 | Rego et al. |
| 7,695,643 B2 | 4/2010 | Fritzsche et al. |
| 7,892,474 B2 | 2/2011 | Shkolnik et al. |
| 8,088,245 B2 | 1/2012 | Lutz et al. |
| 8,110,135 B2 | 2/2012 | El-Siblani |
| 8,912,113 B2 | 12/2014 | Ravichandran et al. |
| 9,205,601 B2 | 12/2015 | Desimone et al. |
| 9,211,678 B2 | 12/2015 | Desimone et al. |
| 9,216,546 B2 | 12/2015 | Desimone et al. |
| 9,453,142 B2 | 9/2016 | Rolland et al. |
| 9,598,606 B2 | 3/2017 | Rolland et al. |
| 9,676,963 B2 | 6/2017 | Rolland et al. |
| 9,982,164 B2 | 5/2018 | Rolland et al. |
| 10,023,764 B2 | 7/2018 | Hsieh et al. |
| 2013/0292862 A1 | 11/2013 | Joyce |
| 2013/0295212 A1 | 11/2013 | Chen et al. |
| 2015/0184039 A1 | 7/2015 | Lutz et al. |
| 2015/0240113 A1 | 8/2015 | Pratt et al. |
| 2015/0331402 A1 | 11/2015 | Lin et al. |
| 2015/0360419 A1 | 12/2015 | Willis et al. |
| 2016/0160077 A1 | 6/2016 | Rolland et al. |
| 2016/0288376 A1 | 10/2016 | Sun et al. |
| 2016/0369096 A1 | 12/2016 | Rolland et al. |
| 2017/0129167 A1 | 5/2017 | Castanon |
| 2017/0129169 A1 | 5/2017 | Batchelder et al. |
| 2017/0173872 A1* | 6/2017 | McCall ................. B29C 64/124 |
| 2018/0126630 A1 | 5/2018 | Panzer et al. |
| 2018/0243976 A1 | 8/2018 | Feller |
| 2018/0290374 A1 | 10/2018 | Willis et al. |

FOREIGN PATENT DOCUMENTS

CN          105026167       *   6/2017

OTHER PUBLICATIONS

Lefebvre et al, CN 105026167 Machine Translation, Jun. 13, 2017 (Year: 2017).*

(Continued)

*Primary Examiner* — Jessica Whiteley
(74) *Attorney, Agent, or Firm* — Myers Bigel, P.A.

(57) ABSTRACT

Provided herein is a resin product useful for the production of three-dimensional objects by additive manufacturing, and methods using the same. The resin may include a reactive blocked prepolymer comprising a prepolymer blocked with reactive blocking groups; a polyol; a photoinitiator; and at least one organometallic catalyst. A packaged product useful for the production of three-dimensional objects by additive manufacturing, the product comprising a single container having a single chamber and a resin in the chamber with all components mixed together, is also provided.

21 Claims, No Drawings

(56) References Cited

OTHER PUBLICATIONS

International Preliminary Report on Patentability corresponding to PCT/US2019/052553; dated Apr. 8, 2020 (16 pages).
International Search Report and Written Opinion corresponding to PCT/US2019/052553; dated Dec. 13, 2019 (11 pages).
Blank, Werner J., et al., "Catalysis of Blocked Isocyanates with Non-Tin Catalysts", ACS Meeting Aug. 1998 in Boston, MA; PMSE Div, 1998, 6 pages.
Blank, Werner J., et al., "Catalysis of the isocyanate-hydroxyl reaction by non-tin catalysts", Progress in Organic Coatings 35(1-4), 1999, 19-29.
Janusziewicz, Rima, et al., "Layerless fabrication with continuous liquid interface production", PNAS, 113, 2016, 11703-11708.
Tumbleston, John R., et al., "Continuous liquid interface production of 3D Objects", Science, 347(6228), 2015, 1349-1352.

\* cited by examiner

DUAL CURE RESINS FOR ADDITIVE MANUFACTURING

CROSS REFERENCE TO RELATED APPLICATIONS

This application is a continuation of U.S. patent application Ser. No. 17/276,858, filed Mar. 17, 2021, now allowed, which is a 35 U.S.C. § 371 national phase application of International Application Ser. No. PCT/US2019/052553, filed Sep. 24, 2019, which claims priority to U.S. Provisional Application Ser. Nos. 62/735,987 and 62/858,687, filed Sep. 25, 2018, and Jun. 7, 2019, respectively, the entire contents of which are hereby incorporated by reference.

FIELD OF THE INVENTION

The present invention concerns additive manufacturing in general, and particularly concerns dual cure resins suitable for bottom-up or top-down stereolithography.

BACKGROUND OF THE INVENTION

In conventional additive manufacturing techniques (often referred to as "3D printing"), construction of a three-dimensional object is performed in a step-wise or layer-by-layer manner by sequentially exposing a light-polymerizable resin to patterned light. Generally referred to as "stereolithography," numerous examples are known, including those described in U.S. Pat. No. 5,236,637 to Hull (see, e.g., FIGS. 3-4) and U.S. Pat. No. 7,892,474 to Shkolnik. Additional examples are given in U.S. Pat. Nos. 5,391,072 and 5,529,473 to Lawton, U.S. Pat. No. 7,438,846 to John, U.S. Pat. No. 8,110,135 to El-Siblani, and U.S. Patent Application Publication Nos. 2013/0292862 to Joyce and 2013/0295212 to Chen et al.

Unfortunately, additive manufacturing techniques have generally been slow, and have long been known to produce parts with a limited range of mechanical properties, frequently rendering such products unsuitable for real world use beyond simple prototyping.

Techniques referred to as "continuous liquid interface production" (or "CLIP") have been developed more recently. These techniques enable the rapid production of three-dimensional objects, preferably in a layerless manner, by which the parts may have desirable structural and mechanical properties. See, e.g., J. DeSimone et al., U.S. Pat. Nos. 9,211,678; 9,205,601; and 9,216,546; J. Tumbleston, et al., *Continuous liquid interface production of 3D Objects*, Science 347, 1349-1352 (2015), and R. Janusziewcz et al., Layerless fabrication with continuous liquid interface production, Proc. Natl. Acad. Sci. USA 113, 11703-11708 (2016).

More recently, dual cure stereolithography resins suitable for stereolithography techniques (particularly for CLIP) are described in J. Rolland et al., U.S. Pat. Nos. 9,453,142, 9,676,963, and 9,598,606, and US Patent Application Publication No. 2016/0160077. These resins usually include a first polymerizable component typically polymerized by light (sometimes referred to as "Part A") from which an intermediate object is produced, and also include at least a second polymerizable component ("Part B") which is usually cured after the intermediate object is first formed, and which imparts desirable structural and/or tensile properties to the final object.

These two developments have spurred the application of additive manufacturing processes beyond the manufacture of (primarily) prototype objects, to functional objects more suited to a variety of end uses. This has spurred the need for new resin formulations which have good performance characteristics during additive manufacturing, produce finished objects with satisfactory tensile characteristics, have reasonable storage stability, and are suitable for convenient forms of packaging and dispensing.

SUMMARY OF THE INVENTION

A first aspect of the present invention is a resin product useful for the production of three-dimensional objects by additive manufacturing, the resin including: (a) a reactive blocked prepolymer comprising a prepolymer blocked with reactive blocking groups; (b) a polyol (e.g., a diol, a triol, etc., including combinations thereof); (c) a photoinitiator; and (d) at least one organometallic catalyst.

In some embodiments, the resin comprises: (a) a reactive blocked prepolymer comprising a prepolymer blocked with reactive blocking groups (e.g., in an amount of from 5 to 90 percent by weight); (b) a polyol (e.g., a diol or triol) (e.g., in an amount of from 5 to 30 or 40 percent by weight); (c) a photoinitiator (e.g., a free radical photoinitiator) (e.g., in an amount of from 0.1 to 4 percent by weight); (d) at least one organometallic catalyst (e.g., in a total amount of from 0.01, 0.05, 0.1, 0.2, or 0.3 percent by weight to 1, 2 or 3 percent by weight); (e) optionally, but in some embodiments preferably, a reactive diluent (e.g., in an amount of from 1 or 5 percent by weight to 40 or 50 percent by weight); (f) optionally, but in some embodiments preferably, a filler (e.g., in an amount of from 1, 2, 5 or 10 percent by weight to 50 percent by weight); and (g) optionally, but in some embodiments preferably, a pigment or dye (e.g., in an amount of from 0.05, 0.1 or 0.5 percent by weight to 2, 4 or 6 percent by weight).

In some embodiments, the prepolymer comprises a polyurethane prepolymer, a polyurea prepolymer, a polyurethane-polyurea copolymer, or a combination thereof.

In some embodiments, the reactive blocked prepolymer comprises reactive end groups selected from the group consisting of acrylates, methacrylates, alpha-olefins, N-vinyls, acrylamides, methacrylamides, styrenics, epoxides, thiols, 1,3-dienes, vinyl halides, acrylonitriles, vinyl esters, maleimides, and vinyl ethers.

In some embodiments, the reactive blocking group comprises an amine (meth)acrylate monomer blocking agent (e.g., tertiary-butylaminoethyl methacrylate (TBAEMA), tertiary pentylaminoethyl methacrylate (TPAEMA), tertiary hexylaminoethyl methacrylate (THAEMA), tertiary-butylaminopropyl methacrylate (TBAPMA), tertiary-octylaminoethyl methacrylate (TOAEMA), acrylate analogs thereof, and mixtures thereof).

In some embodiments, the reactive blocked prepolymer comprises a (meth)acrylate-blocked prepolymer.

In some embodiments, the reactive blocked prepolymer is blocked with a vinyl amide blocking agent such as N-vinylformamide (NVF) or N-vinylacetamide (NVA).

In some embodiments, the reactive blocked prepolymer comprises a vinyl amide blocked polyisocyanate such as an N-vinylformamide blocked polyisocyante.

In some embodiments, the reactive diluent is present and may include an acrylate, a methacrylate, a styrene, a vinylamide, a vinyl ether, a vinyl ester, polymers containing any one or more of the foregoing, and combinations with one or more of the foregoing (e.g., acrylonitrile, styrene, divinyl benzene, vinyl toluene, methyl acrylate, ethyl acrylate, butyl acrylate, a fatty alcohol (meth)acrylate such as lauryl acrylate, isobornyl acrylate (IBOA), isobornyl methacrylate (IBOMA), an alkyl ether of mono-, di- or triethylene glycol acrylate or methacrylate, a fatty alcohol acrylate or methacrylate such as lauryl (meth)acrylate, and mixtures thereof).

In some embodiments, the organometallic catalyst comprising: a metal amidine complex and/or a second compound, wherein the second compound is a metal carboxylate or a carboxylic acid, and/or a third compound wherein the third compound is a metal chelate complex of an acetylacetonate (e.g., pentanedione), optionally wherein the metal of the metal amidine complex and the metal of the metal carboxylate and/or the metal of the metal acetylacetonate (when present) are not identical. In some embodiments, the metal amidine complex is of the chemical formula metal (amidine)$_w$(carboxylate)$_2$, wherein w is an integer from 1 to 4. In some embodiments, the metal of the metal amidine complex, the metal of the metal carboxylate, and the metal of the chelate complex are independently copper, zinc, lithium, sodium, magnesium, barium, potassium, calcium, bismuth, cadmium, aluminum, zirconium, tin, hafnium, titanium, lanthanum, vanadium, niobium, tantalum, tellurium, molybdenum, tungsten, or cesium. In some embodiments, the metal of the metal amidine complex and the metal of the metal carboxylate are independently zinc or bismuth. In some embodiments, the amidine is 1,1,3,3-tetramethyl guanidine or 1-methylimidazole. In some embodiments, the chelate is pentanedione, hexafluoropentanedione or tetramethyloctanedione. In some embodiments, the carboxylate is octoate, neodecanoate, naphthenate, stearate, or oxalate. In some embodiments, the second compound comprises a zinc carboxylate and/or a bismuth carboxylate.

A second aspect of the invention is a packaged product useful for the production of three-dimensional objects by additive manufacturing, the product comprising a single container having a single chamber and a resin in the chamber, the resin comprising a resin as described herein, with all components mixed together (i.e., a "1K resin").

A further aspect of the invention is a method of making a three-dimensional object, comprising: dispensing a resin as described herein (which may be from a packaged produce as described herein) into an additive manufacturing apparatus (e.g., a bottom-up or top-down stereolithography apparatus); producing an intermediate object from the resin by photopolymerization in the additive manufacturing apparatus; and then heating and/or microwave irradiating the intermediate object to further polymerize said resin and form said three-dimensional object.

In some embodiments, the producing is carried out by photopolymerizing said reactive blocked prepolymer to form a polymer scaffold carrying said polyol; and said heating and/or microwave irradiating is carried out under conditions in which said polymer scaffold at least partially degrades and regenerates said prepolymer, said prepolymer in turn polymerizing with said polyol to form said three-dimensional object.

The foregoing and other objects and aspects of the present invention are explained in greater detail in the specification set forth below. The disclosures of all United States patent references cited herein are to be incorporated herein by reference to the extent consistent with the present disclosure.

DETAILED DESCRIPTION OF ILLUSTRATIVE EMBODIMENTS

The present invention is now described more fully hereinafter with reference to embodiments. This invention may, however, be embodied in many different forms and should not be construed as limited to the embodiments set forth herein; rather these embodiments are provided so that this disclosure will be thorough and complete and will fully convey the scope of the invention to those skilled in the art.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements components and/or groups or combinations thereof, but do not preclude the presence or addition of one or more other features, integers, steps, operations, elements, components and/or groups or combinations thereof. The sequence of operations (or steps) is not limited to the order presented in the claims or figures unless specifically indicated otherwise.

As used herein, the term "and/or" includes any and all possible combinations or one or more of the associated listed items, as well as the lack of combinations when interpreted in the alternative ("or").

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and claims and should not be interpreted in an idealized or overly formal sense unless expressly so defined herein. Well-known functions or constructions may not be described in detail for brevity and/or clarity.

It will be understood that, although the terms first, second, etc., may be used herein to describe various elements, components, regions, layers and/or sections, these elements, components, regions, layers and/or sections should not be limited by these terms. Rather, these terms are only used to distinguish one element, component, region, layer and/or section, from another element, component, region, layer and/or section. Thus, a first element, component, region, layer or section discussed herein could be termed a second element, component, region, layer or section without departing from the teachings of the present invention.

1. Catalysts.

In the present invention, one or more metal organometallic chelate catalysts, such as non-tin catalysts, are advantageously incorporated into the resin composition. Such catalysts are known and described in, for example, U.S. Pat. No. 5,965,686 to Blank et al., U.S. Pat. No. 8,912,113 to Ravichandran et al.; U.S. Pat. No. 9,066,316 to Hsieh et al., and U.S. Pat. No. 10,023,764 to Hsieh et al.; and in W. Blank et al., *Catalysis of the Isocyanate-Hydroxyl Reaction by Non-Tin Catalysts* (1999); W. Blank et al., *Catalysis of Blocked Isocyanates with Non-Tin Catalysts* (2000); J. Florio et al., *Novel Bismuth Carboxylate Catalysts with Good Hydrolytic Stability and HFO Compatibility* (2017); the disclosures of which are incorporated herein by reference in their entirety.

In some embodiments, the organometallic catalyst comprises: a metal amidine complex and/or a second compound, wherein the second compound is a metal carboxylate or a carboxylic acid, and/or a third compound wherein the third compound is a metal chelate complex of an acetylacetonate (e.g., pentanedione), optionally wherein the metal of the metal amidine complex and the metal of the metal carboxylate and/or the metal of the metal acetylacetonate (when present) are not identical. Note that the various organic groups can be substituted or unsubstituted. For example, the acetylacetonate can be further substituted, for instance with one to six methyl groups or one to six fluorines at the 1 and 5 positions, In some embodiments, the metal amidine complex is of the chemical formula metal(amidine)$_w$(carboxylate)$_2$, wherein w is an integer from 1 to 4.

In some embodiments, the metal of the metal amidine complex, the metal of the metal carboxylate, and the metal of the chelate complex are independently copper, zinc, lithium, sodium, magnesium, barium, potassium, calcium, bismuth, cadmium, aluminum, zirconium, tin, hafnium, titanium, lanthanum, vanadium, niobium, tantalum, tellurium, molybdenum, tungsten, or cesium.

In some embodiments, the metal of the metal amidine complex and the metal of the metal carboxylate are independently zinc or bismuth.

In some embodiments, the amidine is 1,1,3,3-tetramethyl guanidine or 1-methylimidazole.

In some embodiments, the chelate is pentanedione, hexafluoropentanedione or tetramethyloctanedione.

In some embodiments, the carboxylate is octoate, neodecanoate, naphthenate, stearate, or oxalate.

In some embodiments, the second compound comprises a zinc carboxylate and/or a bismuth carboxylate.

Particular examples of suitable catalysts include, but are not limited to K-KAT® catalysts 4205, XK-348, XK-635, XK-651, XK-661, XK-672, and XK-678, available from KingIndustries, 1 Science Road, Norwalk, CT 06852 USA (See generally King Industries, *K-KAT® Guide to Tin-Free Catalysts for Urethane Coatings* (2018)).

2. Resins.

In addition to the catalysts described above, additional constituents for a dual cure resin of the present invention are described in, for example, U.S. Pat. Nos. 9,453,142; 9,598,606; 9,676,963; and 9,982,164 to Rolland et al, the disclosures of which are incorporated herein by reference.

In general, a resin of the present invention may include:
(a) a reactive blocked prepolymer comprising a prepolymer blocked with reactive blocking groups (e.g., in an amount of from 5 to 90 percent by weight);
(b) a polyol (e.g., a diol, a triol, etc., including combinations thereof) (e.g., in an amount of from 5 to 30 or 40 percent by weight);
(c) a photoinitiator (e.g., a free radical photoinitiator) (e.g., in an amount of from 0.1 to 4 percent by weight);
(d) at least one organometallic catalyst (e.g., in a total amount of from 0.01, 0.05, 0.1, 0.2, or 0.3 percent by weight to 1, 2 or 3 percent by weight);
(e) optionally, but in some embodiments preferably, a reactive diluent (e.g., in an amount of from 1 or 5 percent by weight to 40 or 50 percent by weight);
(f) optionally, but in some embodiments preferably, a filler (e.g., in an amount of from 1, 2, 5 or 10 percent by weight to 50 percent by weight); and
(g) optionally, but in some embodiments preferably, a pigment or dye (e.g., in an amount of from 0.05, 0.1 or 0.5 percent by weight to 2, 4 or 6 percent by weight).

In some embodiments, the prepolymer comprises a polyurethane prepolymer, a polyurea prepolymer, a polyurethane-polyurea copolymer, or a combination thereof.

In some embodiments, the reactive blocked prepolymer comprises reactive end groups selected from the group consisting of acrylates, methacrylates, alpha-olefins, N-vinyls, acrylamides, methacrylamides, styrenics, epoxides, thiols, 1,3-dienes, vinyl halides, acrylonitriles, vinyl esters, maleimides, and vinyl ethers.

In some embodiments, the reactive blocking group comprises an amine (meth)acrylate monomer blocking agent (e.g., tertiary-butylaminoethyl methacrylate (TBAEMA), tertiary pentylaminoethyl methacrylate (TPAEMA), tertiary hexylaminoethyl methacrylate (THAEMA), tertiary-butylaminopropyl methacrylate (TBAPMA), tertiary-octylaminoethyl methacrylate (TOAEMA), acrylate analogs thereof, and mixtures thereof).

In some embodiments, the reactive blocking group comprises a vinyl amide blocking agent such as N-vinylformamide (NVF) or N-vinylacetamide (NVA).

In some embodiments, the reactive blocked prepolymer comprises a (meth)acrylate-blocked prepolymer. In some embodiments, the reactive blocked prepolymer comprises a vinylamide blocked polyisocyanate.

In some embodiments, the prepolymer comprises blocked polyisocyanates. Polyisocyanates (including diisocyanates) useful in carrying out the present invention include, but are not limited to, 1,1'-methylenebis(4-isocyanatobenzene) (MDI), 2,4-diisocyanato-1-methylbenzene (TDI), methylene-bis(4-cyclohexylisocyanate) (H12MDI), hexamethylene diisocyanate (HDI), isophorone diisocyanate (IPDI), 2,2,4-(2,4,4-) trimethylhexane 1,6-diisocyantate (TMHDI, e.g., VESTANAT® TMDI, available from Evonik (Essen, Germany)), polymeric MDI, 1,4-phenylene diisocyanate (PPDI), and o-tolidine diisocyanate (TODI). A preferred diisocyanate in some embodiments is H12MDI, such as Desmodur® W, supplied by Covestro AG (Leverkusen, Germany). Additional examples include but are not limited to those given in U.S. Pat. No. 3,694,389 to Levy.

Examples of diol or polyol (e.g., triol) chain extenders include, but are not limited to, ethylene glycol, diethylene glycol, triethylene glycol, tetraethylene glycol, propylene glycol, dipropylene glycol, tripropylene glycol, 1,3-propanediol, 1,3-butanediol, 1,4-butanediol, neopentyl glycol, 1,6-hexanediol, 1,4-cyclohexanedimethanol, hydroquinone bis(2-hydroxyethyl) ether (HQEE), glycerol, trimethylolpropane, 1,2,6-hexanetriol, and pentaerythritol. Natural oil polyols (biopolyols) may also be used. Such polyols may be derived, e.g., from vegetable oils (triglycerides), such as soybean oil, by known techniques. See, e.g., U.S. Pat. No. 6,433,121 to Petrovic et al. Alkoxylates such as ethoxylates, propoxylates, butoxylates, etc., of diols, triols and higher polyalcohols may also be used, for instance, trimethylolpropane ethoxylate Mn=450 (TPE), which in some embodiments is preferred.

In some embodiments, the reactive diluent comprises an acrylate, a methacrylate, a styrene, a vinylamide, a vinyl ether, a vinyl ester, polymers containing any one or more of the foregoing, or a combination of one or more of the foregoing (e.g., acrylonitrile, styrene, divinyl benzene, vinyl toluene, methyl acrylate, ethyl acrylate, butyl acrylate, methyl (meth)acrylate, isobornyl acrylate (IBOA), isobornyl methacrylate (IBOMA), 4-t-butyl-cyclohexyl (meth)acrylate, cyclic trimethylolpropane formal (meth)acrylate, 3,3,5-trimethylcyclohexyl (meth)acrylate, tricyclodecane dimethanol di(meth)acrylate, an alkyl ether of mono-, di- or triethylene glycol acrylate or methacrylate, a fatty alcohol acrylate or methacrylate such as lauryl (meth)acrylate, and mixtures thereof).

Photoinitiators included in the polymerizable liquid (resin) can be any suitable photoiniator, including type I and type II photoinitiators and including commonly used UV photoinitiators, examples of which include but are not limited to acetophenones (diethoxyacetophenone for example), phosphine oxides such as diphenyl(2,4,6-trimethylbenzoyl)phosphine oxide, phenylbis(2,4,6-trimethylbenzoyl) phosphine oxide (PPO), Irgacure® 369, etc. See, e.g., U.S. Pat. No. 9,453,142 to Rolland et al. The liquid resin can have solid particles suspended or dispersed therein. Any suitable solid particle can be used, depending upon the end product being fabricated. The particles can be metallic, organic/polymeric, inorganic, or composites or mixtures thereof. The particles can be nonconductive, semi-conductive, or conductive (including metallic and non-metallic or polymer conductors); and the particles can be magnetic, ferromagnetic, paramagnetic, or nonmagnetic. The particles can be of any suitable shape, including spherical, elliptical, cylindrical, etc. The particles can be of any suitable size (for example, ranging from 1 nm to 20 µm average diameter).

The particles can comprise an active agent or detectable compound as described below, though these may also be provided dissolved or solubilized in the liquid resin as also discussed below. For example, magnetic or paramagnetic particles or nanoparticles can be employed.

The liquid resin can have additional ingredients solubilized therein, including pigments, dyes, diluents, active compounds or pharmaceutical compounds, detectable compounds (e.g., fluorescent, phosphorescent, radioactive), etc., again depending upon the particular purpose of the product being fabricated. Examples of such additional ingredients include, but are not limited to, proteins, peptides, nucleic acids (DNA, RNA) such as siRNA, sugars, small organic compounds (drugs and drug-like compounds), etc., including combinations thereof.

Dyes/non-reactive light absorbers. In some embodiments, resins for carrying out the present invention include a non-reactive pigment or dye that absorbs light, particularly UV light. Suitable examples of such light absorbers include, but are not limited to: (i) titanium dioxide (e.g., included in an amount of from 0.05 or 0.1 to 1 or 5 percent by weight), (ii) carbon black (e.g., included in an amount of from 0.05 or 0.1 to 1 or 5 percent by weight), and/or (iii) an organic ultraviolet light absorber such as a hydroxybenzophenone, hydroxyphenylbenzotriazole, oxanilide, benzophenone, thioxanthone, hydroxyphenyltriazine, and/or benzotriazole ultraviolet light absorber (e.g., Mayzo BLS1326) (e.g., included in an amount of 0.001 or 0.005 to 1, 2 or 4 percent by weight). Examples of suitable organic ultraviolet light absorbers include, but are not limited to, those described in U.S. Pat. Nos. 3,213,058; 6,916,867; 7,157,586; and 7,695,643, the disclosures of which are incorporated herein by reference.

Fillers. Any suitable filler may be used in connection with the present invention, depending on the properties desired in the part or object to be made. Thus, fillers may be solid or liquid, organic or inorganic, and may include reactive and non-reactive rubbers, siloxanes, acrylonitrile-butadiene rubbers, reactive and non-reactive thermoplastics (including but not limited to: poly(ether imides), maleimide-styrene terpolymers, polyarylates, polysulfones and polyethersulfones, etc.) inorganic fillers such as silicates (such as talc, clays, silica, mica), glass, carbon nanotubes, graphene, cellulose nanocrystals, etc., including combinations of all of the foregoing. Suitable fillers include tougheners, such as core-shell rubbers, as discussed below.

Tougheners. One or more polymeric and/or inorganic tougheners can be used as a filler in the present invention. The toughener may be uniformly distributed in the form of particles in the cured product. The particles could be less than 5 microns (µm) in diameter. Such tougheners include, but are not limited to, those formed from elastomers, branched polymers, hyperbranched polymers, dendrimers, rubbery polymers, rubbery copolymers, block copolymers, core-shell particles, oxides or inorganic materials such as clay, polyhedral oligomeric silsesquioxanes (POSS), carbonaceous materials (e.g., carbon black, carbon nanotubes, carbon nanofibers, fullerenes), ceramics and silicon carbides, with or without surface modification or functionalization.

Core-shell rubbers. Core-shell rubbers are particulate materials (particles) having a rubbery core. Such materials are known and described in, for example, US Patent Application Publication No. 20150184039, as well as US Patent Application Publication No. 20150240113, and U.S. Pat. Nos. 6,861,475, 7,625,977, 7,642,316, 8,088,245, and elsewhere. In some embodiments, the core-shell rubber particles are nanoparticles (i.e., having an average particle size of less than 1000 nanometers (nm)). Generally, the average particle size of the core-shell rubber nanoparticles is less than 500 nm, e.g., less than 300 nm, less than 200 nm, less than 100 nm, or even less than 50 nm. Typically, such particles are spherical, so the particle size is the diameter; however, if the particles are not spherical, the particle size is defined as the longest dimension of the particle. Suitable core-shell rubbers include, but are not limited to, those sold by Kaneka Corporation under the designation Kaneka Kane Ace, including the Kaneka Kane Ace 15 and 120 series of products, including Kaneka Kane Ace MX 120, Kaneka Kane Ace MX 153, Kaneka Kane Ace MX 154, Kaneka Kane Ace MX 156, Kaneka Kane Ace MX170, Kaneka Kane Ace MX 257 and Kaneka Kane Ace MX 120 core-shell rubber dispersions, and mixtures thereof.

Organic diluents. In some embodiments, diluents for use in the present invention are preferably reactive organic diluents; that is, diluents that will degrade, isomerize, cross-react, or polymerize, with themselves or a light polymerizable component, during the additive manufacturing step. In general, the diluent(s) are included in an amount sufficient to reduce the viscosity of the polymerizable liquid or resin (e.g., to not more than 15,000, 10,000, 6,000, 5,000, 4,000, or 3,000 centipoise at 25 degrees Centigrade). Suitable examples of diluents include, but are not limited to, isobornyl methacrylate, TBAEMA (tert-butyl amino ethyl methacrylate), tetrahydrofurfuryl methacrylate, N,N-dimethylacrylamide, N-vinyl-2-pyrrolidone, N-vinylformamide, and Michael adducts of N-vinylformamide with (meth)acrylates (known and described in, for example, U.S. Pat. No. 5,672,731 to Chen et al.), or a mixture if two or more thereof. The diluent may be included in the polymerizable liquid in any suitable amount, typically from 1, 5 or 10 percent by weight, up to about 30 or 40 percent by weight, or more.

Resin packaging. As noted above, the resin may be packaged as two separate precursors, which are mixed together and dispensed prior to use (sometimes referred to as "2K resins") or may be packaged in a premixed form, in the same chamber of a single container (sometimes referred to as a "1K" resin). In either case, the resin is dispensed into an additive manufacturing apparatus for production of a "green" intermediate object, as discussed further below.

3. Use in additive manufacturing.

Techniques for additive manufacturing are known. Suitable techniques include bottom-up or top-down additive manufacturing, generally known as stereolithography. Such methods are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication No. 2013/0292862 to Joyce, and US Patent Application Publication No. 2013/0295212 to Chen et al. The disclosures of these patents and applications are incorporated by reference herein in their entirety.

In some embodiments, the object is formed by continuous liquid interface production (CLIP). CLIP is known and described in, for example, U.S. Pat. Nos. 9,211,678, 9,205,601, 9,216,546, and in J. Tumbleston, D. Shirvanyants, N. Ermoshkin et al., Continuous liquid interface production of 3D Objects, Science 347, 1349-1352 (2015). See also R. Janusziewcz et al., Layerless fabrication with continuous liquid interface production, Proc. Natl. Acad. Sci. USA 113, 11703-11708 (2016). Other examples of methods and apparatus for carrying out particular embodiments of CLIP include, but are not limited to, those set forth in: B. Feller, US Patent App. Pub. No. US 2018/0243976 (published Aug. 30, 2018); M. Panzer and J. Tumbleston, US Patent App Pub. No. US 2018/0126630 (published May 10, 2018); K. Willis and B. Adzima, US Patent App Pub. No. US 2018/0290374 (Oct. 11, 2018); Batchelder et al., Continuous liquid interface production system with viscosity pump, US Patent Application Pub. No. US 2017/0129169; Sun and Lichkus, Three-dimensional fabricating system for rapidly producing objects, US Patent Application Pub. No. US 2016/0288376; Willis et al., 3d print adhesion reduction during cure process, US Patent Application Pub. No. US 2015/0360419; Lin et al., Intelligent 3d printing through optimization of 3d print parameters, US Patent Application Pub. No. US 2015/0331402; and D. Castanon, Stereolithography System, US Patent Application Pub. No. US 2017/0129167.

As noted above, in the present invention, a resin as described above is dispensed into an additive manufacturing apparatus (e.g., a bottom-up or top-down stereolithography apparatus), and an intermediate object produced in the apparatus by photopolymerization. The intermediate object is optionally cleaned (e.g., by washing), and then heated and/or microwave irradiated to further polymerize the resin and form the three-dimensional object. In general, the producing step is carried out by photopolymerizing the reactive blocked prepolymer to form a polymer scaffold carrying a polyol; and the heating and/or microwave irradiating step is carried out under conditions in which said polymer scaffold at least partially degrades and generates a reactive prepolymer, said prepolymer in turn polymerizing with said polyol to form said three-dimensional object. See generally U.S. Pat. Nos. 9,453,142; 9,598,606; 9,676,963; and 9,982,164 to Rolland et al., the disclosures of which are incorporated herein by reference.

The present invention is further described in the following non-limiting examples.

EXAMPLES

Example 1: Alcohol cure of AmBPU. Use of a diol or triol curative with amide (NVF) blocked diisocyanate overcomes the rapid side reaction that can occur with an amine curative. Printed dog bones show desirable elastomer properties after 160° C. post-cure.

An amide-blocked polyurethane (AmBPU) was formed in which N-vinylformamide (NVF) replaces sterically hindered amine t-BAEMA (Scheme 1).

Scheme 1. Vinyl Amide Blocked Polyurethane

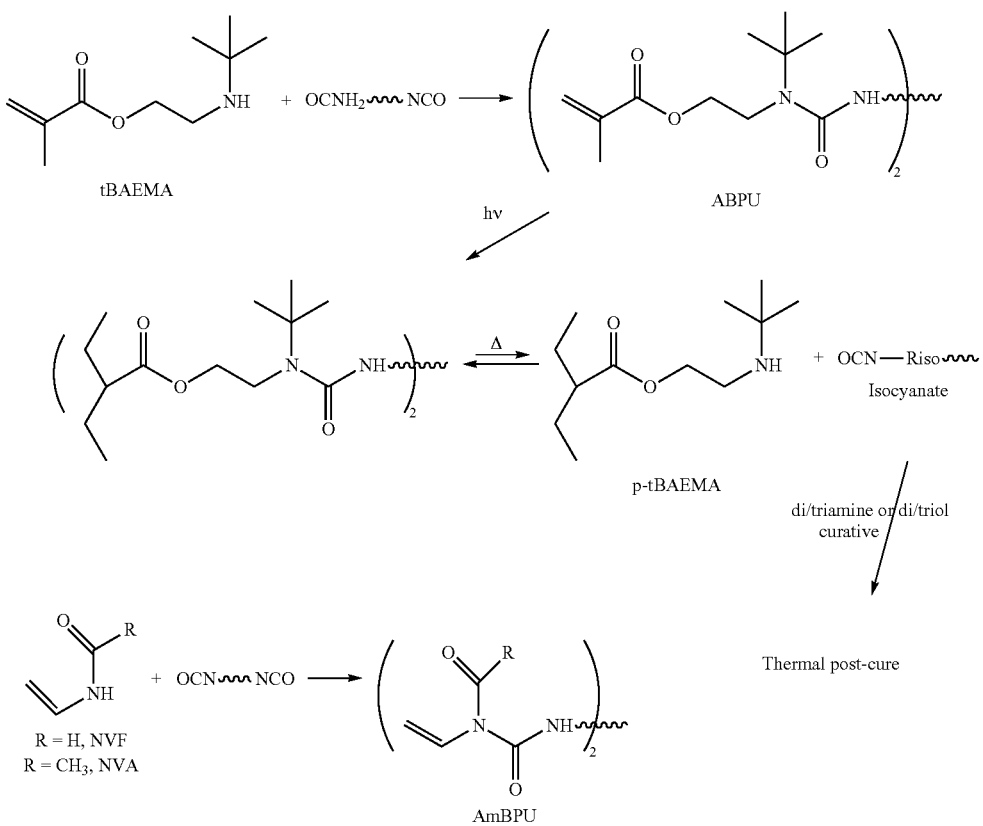

Use of a triamine curative rapidly degraded the vinylimide at room temperature. Switching to an alcohol curative, trimethylolpropane ethoxylate (TPE), and adding Kkat 348 urethane catalyst gave a more stable formulation. The NVF-tBAEMA-HDI-PTMO650 AmBPU [1/0.05/1/1] was diluted with isobornyl acrylate (IBOA) to provide a small excess of acrylate and printed, using RPU70 (methacrylate) settings for convenience. The resulting dog bones with faster reacting vinylimide-acrylate were somewhat oversized (normal width/thickness ~3.18/3.98 mm).

Post-cure at 120° C. (12 hr) or 160° C. (4 hr) reduced stickiness (especially in the latter case) and dramatically improved elasticity and tensile performance, as shown in Table 1. Cure at 160° C. showed over 300% elongations.

These results demonstrate the viability of using NVF as a tBAEMA replacement in alcohol post-cured engineering resins.

TABLE 1

Material Properties

| NVF AmBPU + TPE | Width (mm) | Thickness (mm) | Modulus | Ultimate Tensile Strength (MPa) | Tensile Strength at Yield (MPa) | Elong @ Yld (mm/mm) |
|---|---|---|---|---|---|---|
| green | 3.9 | 4.5 | 0.91 | 2.96 | 2.88 | 0.57 |
| 12 hr 120° C. | 3.9 | 4.5 | 0.61 | 2.86 | 2.79 | 1.4 |
| 4 hr 160° C. | 3.43 | 3.806 | 1.96 | 7.52 | 7.52 | 3.24 |

Example 2: N-vinylacetamide (NVA) based AmBPU. More stable, but slightly more hindered N-vinylacetamide reacted unusably slowly with hexanediisocyanate.

NVA is generally more stable than NVF, offers a different $T_g$, and is commercially available (Showa Denko K. K., Tokyo, Japan). Conversion to a final AmBPU under conditions used with NVF, however, was slow. Temperatures of 81° C. with both Zr and Bi catalysts at 0.5% levels achieved only 50% apparent conversion over six hours. P. Kurtz and H. Disselnkoetter, Liebigs Ann. Chem., 764, 69 (1972) have reported that only NVF was reactive with isocyanates.

Example 3: Formation of an NVF blocked polyurethane (AmBPU). A 500 mL round bottom three neck flask with mechanical stirrer, dry air feed, addition funnel, thermocouple, and heating bath was charged with 0.5 mole of hexanediisocyanate (HDI), 500 ppm each of MEHQ and di-t-butylated hydroxytoluene (BHT), 2.35 g King Industries K-KAT® 4205 urethane catalyst (1%), and 0.25 mole of N-vinylformamide (NVF). The sample was heated to 78° C. while stirring. The reaction began exotherming at around 65° C. and stabilized after 10 min. A second 0.25 mole of NVF was added and the temperature was maintained at 74-76° C. until tlc showed essentially complete NVF consumption (2 hr 15 min). Poly(tetramethyleneoxide), (PTMO), MW 650, 0.259 mole was added slowly with a rapid temperature rise to 88° C. After 30 min the exotherm was complete. Tetraethylene glycol (0.01 equivalent) was added and a reaction sample titrated for zero NCO (confirmed by IR). An additional 74 mg of BHT was added and the reaction was terminated. NMR showed >85% conversion of NVF.

Example 4: CLIP Printing of AmBPU. 50.4 g of the resin of Example 3 was combined with 22.3 g of isobornyl acrylate, 12.24 g of trimethylolpropane ethoxylate (TPE, MW 450), 1.27 g of TPO-L photoinitiator, and 0.086 g of BLS1326 light stabilizer. This was thoroughly mixed on a Thinky mixer and 15 dog bones were printed on a Carbon M1 printer (Carbon Inc., Redwood City, California). Dog bones were post-cured at different temperatures and Instron tensiles were pulled with the results shown in the Table 2.

TABLE 2

| NVF AmBPU + IBOA + TPE (has 1% Kkat 4205) | Modulus (Auto Young's) | Tensile strain (mm/mm) | Tensile stress @ Break (Mpa) | # Repeats |
|---|---|---|---|---|
| 1.5% TPO-L + 0.1% BLS1326, Green | 10.7 | 0.57 | 3.04 | 5 |
| 120° C./4 hr | 11.7 | 0.55 | 2.78 | 5 |
| 140° C./6 hr | 6.11 | 1.4 | 2.81 | 5 |
| 160° C./4 hr | 8.19 | 3.1 | 4.87 | 4 |

The modulus and tensile stress declined somewhat and the elongation improved dramatically as polyurethane networks formed on reaction with the triol curative.

Example 5: Triamine versus Triol Cure of ABPU. Part A of commercial 3D printing resin RPU70 (Carbon Inc., Redwood City, California), which contains t-butylaminoethyl methacrylate blocked ABPUs, in control runs was combined through an in-line mixer with Huntsman triamine curative, T403, MW 440, in a ratio to react with the blocked isocyanate groups and 3D printed within 1 to 24 hrs. The printed dog bone samples were then post-cured in an oven, for 8 to 12 hrs at 120° C. Tensiles were then pulled on an Instron.

RPU70 Part A was separately mixed (Thinky mixer) with a stoichiometric amount of triol, trimethylolpropane ethoxylate (TPE, MW 450), and a urethane catalyst (K-KAT® XK-651, King Industries, Norwalk, Connecticut). Samples were then printed and cured as above, but with different cure times and temperatures, and evaluated by Instron testing.

Table 3 below compares Instron tensile performance for RPU70 Part A cured with the triamine and the triol curatives, with and without thermal post-cure. Note that the Modulus and tensile stress at break decline somewhat, but the tensile strain increases significantly upon thermal cure, reflecting a significant and desirable increase in flexibility and toughness.

TABLE 3

Triamine vs. Triol Cure

| RPU70A + | Modulus (Auto Young's, MPa) | Tensile strain (mm/mm) | Tensile stress @ Break (MPa) | # Repeats |
|---|---|---|---|---|
| T403 triamine, Green | 1616.5 | 0.04 | 40.7 | 4 |
| T403 6 hr 120° C. cure | 1395.4 | 0.38 | 29.2 | 6 |
| TPE + 0.5% K651, Green | 595.3 | 0.51 | 17.9 | 4 |
| 4 hr 120° C. cure | 813.7 | 0.63 | 27.2 | 5 |
| 2 hr 120° C. + 1 hr 140° C. | 804.9 | 0.54 | 26.7 | 5 |

Example 6: Evaluation of Viscosity Rise in ABPU Resin Formulations. As a faster method to evaluate cure of amine blocked polyurethanes, viscosity rise of a small sample was measured upon heating on a parallel plate rheometer. Samples of RPU70 Part A were hydrogenated in ethyl acetate at room temperature and 165 psi with Pd on carbon catalyst for 12-24 hr to suppress viscosity rise from thermal free radical reaction. After removal of solvent, small samples were mixed as above and about 14 microliter samples were placed under an 8 mm Al parallel plate on a TA Instruments Discovery rheometer in oscillation mode and heated with measurement of initial viscosity and G' (viscosity) vs. time and temperature.

Hydrogenated RPU70 Part A (HRPU70A) samples without curative or with only triol curative gave little or no viscosity rise up to 160° C., as reflected in Table 4. By contrast, addition of T403 triamine resulted in a rise in viscosity at 120° C. after about 45 minutes. There was no viscosity rise/cure with no curative, or with triol (triethanolamine (TEOA) or TPE) without catalyst.

There was also no triol cure under these conditions with known tertiary amine urethane catalysts (DMCHA, TBD), but strong, effective cure with metallic urethane catalysts. The speed of cure (time and temperature of cure onset) also increased with metal catalyst concentration. Note that in the last example a mix of tertiary amine and metal catalyst was not as effective.

TABLE 4

Cure of Hydrogenated RPU70A with triol and catalyst

| Resin | Curative | Catalyst | Initial Rise temp (° C.) | Initial Rise Time (sec) | Final G' |
|---|---|---|---|---|---|
| Control RPU70 | none | none | 120 | 1700 | >$10^5$ |
| HRPU70 | none | none | none | no rise | <$10^3$ |
| HRPU70A | T403 | none | 120 | 2700 | >$10^5$ |
| HRPU70A | TEOA triol | none | none | no rise | <$10^3$ |
| HRPU70A | TPE triol | DMCHA* | >160 | >3000 | no cure |
| HRPU70A | TPE triol | 0.25% K651 | 120 | 900 | >$10^5$ |
| HRPU70A | TPE triol | 1.0% K651 | 140 | 380 | $8 \times 10^4$ |
| HRPU70A | TPE triol | 2.5% K651 | 120 | 500 | $3 \times 10^4$ |
| HRPU70A | TPE triol | 1% TBD* | >160 | >3000 | no cure |
| HRPU70A | TPE triol | 2.5% K651 + 1% DMCHA | 180 | 100 | small, slow rise |

*DMCHA = N,N-dimethylcyclohexylamine, TBD = triazabicyclodecene

Example 7: Catalyst Seletion and Cure Speed. Table 5 below shows that catalyst selection impacts cure speed.

TABLE 5

Cure of RPU70A + TPE vs. Catalyst (1%).

| Sample # | Catalyst | Rise temp (° C.) | Rise Time (sec) | Cure speed | |
|---|---|---|---|---|---|
| 1 | DBTDL | 100 | 2600 | medium | diBuSn dilaurate |
| 2 | Cu TMHD$_2$ | 100 | 1600 | medium | Cu bis-Me$_4$-heptanedionate |
| 3 | K682-Bi | 100 | 2000 | slow | |
| 4 | K4205-Zr | 120 | 2700 | poor | |
| 5 | K672-Zn + Zr | 100 | 2300 | medium | |
| 6 | ZnF$_6$AcAc | 100 | 900 | good | Zn F$_6$-acetylacetonate |
| 7 | K635-Zn | 120 | 200 | slow | |

Example 8: 1K formulation stability. Table 6 below shows that fully formulated cure efficiency and viscosity are retained for 100+ days at ambient temperature with triol formulations. By contrast, formulated amine-cured systems show rapid viscosity rise after 24 hr and become solid after a few days.

TABLE 6

Cure Efficiency and Viscosity Vs. Time & Temperature.

| RPU70 + TPE Triol + 0.25% K651 | Modulus | Ultimate Tensile Str | Tensile Str @ Yield | Elong. to Break (mm/mm) | # Repeats | Resin Viscosity, Pa s |
|---|---|---|---|---|---|---|
| green | 649 | 17.2 | 16.7 | 0.4 | 5 | 2.268 |
| 4 hr 120° C. | 874 | 27.1 | 26.1 | 0.48 | 5 | |
| 8 hr 120° C. | 847 | 24.4 | 24.4 | 0.49 | 5 | |
| plus 18 days @ 40° C. green | 341 | 12.2 | 7.95 | 0.81 | 5 | 6.742 |
| 4 hr 120° C. | 732 | 23.7 | 21.1 | 0.86 | 5 | |
| 8 hr 120° C. | 784 | 23.3 | 21.9 | 0.79 | 5 | |
| plus 105 days @ RT green | 731 | 17.2 | 17.1 | 0.55 | 5 | 4.705 |
| 4 hr 140° C. | 904 | 25.7 | 25.3 | 0.05 | 4 | |
| 8 h 140° C. | 1030 | 29.4 | 29.4 | 0.39 | 5 | |
| 4 h 160° C. | 1000 | 27.4 | 27.4 | 0.41 | 3 | |

Example 9: Tensile Performance of ABPU Cured with Triamine vs. Triol. Shown in Table 7 below is a comparison of Instron tensile performance of RPU70 Part A with triamine or triol. The thermally post-cured triol sample shows improvements in modulus, elongation and tensile stress with thermal cure, but modulus is lower than the triamine cured sample, which may be due to the reduced hydrogen bonding of urethane linkages vs. the urea linkages in the triamine cured example.

TABLE 7

| RPU70A+ | Modulus (Auto Young's, MPa) | Tensile strain (mm/mm) | Tensile stress at Break (MPa) | # Repeats |
|---|---|---|---|---|
| T403 triamine 6 hr 120 C. | 1395.4 | 0.38 | 29.2 | 6 |
| TPE triol + 0.5% K651, Green | 595.3 | 0.51 | 17.9 | 4 |
| –4 hr 120° C. | 814 | 0.63 | 27.2 | 5 |
| –2 hr 120° C. + 1 hr 140° C. | 805 | 0.54 | 26.7 | 5 |

Example 10: ABPU Triol Resin Viscosity Stability. Samples of RPU70 Part A formulated with TPE triol and three different catalysts were tested for viscosity stability after 68 days. K348 (0.25%) and K635 (1%) were stable, but K651 (0.5%) showed a tripling of viscosity. This sample, viscosity 6.74 Pa s, was still printable after 100 days, and as reflected in Table 8 below showed an increase in strength with good retention of elongation.

TABLE 8

Properties of printed 1K resin after 100 days

| RPU70 + TPE Triol + 0.5% K651 | Ult. Tensile Str | Elong. to Break mm/mm |
|---|---|---|
| Green | 12.6 | 0.61 |
| 160° C. 4 hrs | 22.5 | 0.43 |
| 140° C. 8 hrs | 25.7 | 0.50 |

The foregoing is illustrative of the present invention, and is not to be construed as limiting thereof. The invention is defined by the following claims, with equivalents of the claims to be included therein.

We claim:

1. A resin useful for the production of three-dimensional objects by additive manufacturing, comprising:
   (a) a reactive blocked prepolymer comprising a prepolymer blocked with reactive blocking groups;
   (b) a polyol;
   (c) a photoinitiator;
   (d) at least one organometallic catalyst comprising: a metal amidine complex and/or a second compound, wherein the second compound is a metal carboxylate or a carboxylic acid, and/or a third compound wherein the third compound is a metal chelate complex of an acetylacetonate;
   (e) optionally, a reactive diluent;
   (f) optionally, and
   (g) optionally, a pigment or dye.

2. The resin of claim 1, wherein said prepolymer comprises a polyurethane prepolymer, a polyurea prepolymer, a polyurethane-polyurea copolymer, or a combination thereof.

3. The resin of claim 1, wherein said reactive blocked prepolymer comprises reactive end groups selected from the group consisting of acrylates, methacrylates, alpha-olefins, N-vinyls, acrylamides, methacrylamides, styrenics, epoxides, thiols, 1,3-dienes, vinyl halides, acrylonitriles, vinyl esters, maleimides, and vinyl ethers.

4. The resin of claim 1, wherein said reactive blocking groups comprise an amine (meth)acrylate monomer blocking agent.

5. The resin of claim 1, wherein said reactive blocked prepolymer comprises a (meth)acrylate-blocked prepolymer.

6. The resin of claim 1, wherein said reactive blocked prepolymer is blocked with a vinyl amide blocking agent.

7. The resin of claim 1, wherein said reactive blocked prepolymer comprises a vinyl amide blocked polyisocyanate.

8. The resin of claim 7, wherein said vinyl amide blocked polyisocyanate comprises an N-vinyl formamide blocked polyisocyanate.

9. The resin of claim 1, wherein said reactive diluent comprises an acrylate, a methacrylate, a styrene, a vinylamide, a vinyl ether, a vinyl ester, polymers containing any one or more of the foregoing, or a combination of two or more of the foregoing.

10. The resin of claim 1, wherein said polyol is a diol or a triol.

11. The resin of claim 1, wherein the metal of the metal amidine complex and the metal of the metal carboxylate and/or the metal of the metal acetylacetonate (when present) are not identical.

12. The resin of claim 1, wherein the metal amidine complex is of the chemical formula metal(amidine)$_w$(carboxylate)$_2$, wherein w is an integer from 1 to 4.

13. The resin of claim 1, wherein the metal of the metal amidine complex, the metal of the metal carboxylate, and the metal of the chelate complex are independently copper, zinc, lithium, sodium, magnesium, barium, potassium, calcium, bismuth, cadmium, aluminum, zirconium, tin, hafnium, titanium, lanthanum, vanadium, niobium, tantalum, tellurium, molybdenum, tungsten, or cesium.

14. The resin of claim 1, wherein the metal of the metal amidine complex and the metal of the metal carboxylate are independently zinc or bismuth.

15. The resin of claim 1, wherein the amidine is 1,1,3,3-tetramethyl guanidine or 1-methylimidazole.

16. The resin of claim 1, wherein the chelate is pentanedione, hexafluoropentanedione or tetramethyloctanedione.

17. The resin of claim 1, wherein the carboxylate is octoate, neodecanoate, naphthenate, stearate, or oxalate.

18. The resin of claim 1, wherein the second compound comprises a zinc carboxylate and/or a bismuth carboxylate.

19. A packaged product useful for the production of three-dimensional objects by additive manufacturing, said product comprising a single container having a single chamber and a resin in the chamber, the resin comprising a resin of claim 1, with all components mixed together.

20. A method of making a three-dimensional object, comprising:
   (a) dispensing the resin of claim 1 into an additive manufacturing apparatus;
   (b) producing an intermediate object from said resin by photopolymerization; and then
   (c) heating and/or microwave irradiating said intermediate object to further polymerize said resin and form said three-dimensional object.

21. The method of claim 20, wherein:

said producing step (b) is carried out by photopolymerizing said reactive blocked prepolymer to form a polymer scaffold carrying said polyol; and said heating and/or microwave irradiating step (c) is carried out under conditions in which said polymer scaffold at least partially degrades and regenerates said prepolymer, said prepolymer in turn polymerizing with said polyol to form said three-dimensional object.

* * * * *

UNITED STATES PATENT AND TRADEMARK OFFICE
CERTIFICATE OF CORRECTION

PATENT NO. : 11,820,072 B2
APPLICATION NO. : 17/645540
DATED : November 21, 2023
INVENTOR(S) : Pinschmidt, Jr. et al.

It is certified that error appears in the above-identified patent and that said Letters Patent is hereby corrected as shown below:

In the Specification

Column 7, Line 5: Please insert a paragraph break between "Rolland et al." and "The liquid"

In the Claims

Column 15, Line 61: Please correct "(f) optionally, and" to read --(f) optionally, a filler; and--

Signed and Sealed this
Sixteenth Day of April, 2024

Katherine Kelly Vidal
*Director of the United States Patent and Trademark Office*